L. DANIELS.
STRAINER.
APPLICATION FILED NOV. 30, 1920.

1,370,292. Patented Mar. 1, 1921.

WITNESSES

INVENTOR
L. Daniels.
BY
ATTORNEYS

UNITED STATES PATENT OFFICE.

LOUIS DANIELS, OF NEW YORK, N. Y.

STRAINER.

1,370,292.   Specification of Letters Patent.   Patented Mar. 1, 1921.

Application filed November 30, 1920. Serial No. 427,335.

*To all whom it may concern:*

Be it known that I, LOUIS DANIELS, a citizen of the United States, and resident of the city of New York, borough of Manhattan, county of New York, and State of New York, have invented a new and Improved Strainer, of which the following is a full, clear, and exact description.

My invention relates to a strainer, and aims to provide a device of this nature, presenting improvements over my Patent #1291429 granted January 14, 1919.

In connection with strainers it is a well appreciated fact that numerous devices have been suggested with a view of providing a strainer which shall be detachably associated with a receptacle, and more particularly a coffee pot, by means of which the fluid, prior to its emergence from the spout of the receptacle, was subjected to a straining action preventing the escape of any particles in the state of suspension within the fluid emerging from the spout.

These devices have left much to be desired in that they were comparatively cumbersome, and hence involved the expenditure of a considerable amount, incident to their manufacture.

A further defect in connection with this class of device is to be found in that a clip portion, or other suitable element was provided, permitting of the association of the strainer with the receptacle, but this clip engaging portion was so constructed as to preclude the subsequent correct closing of the lid of the pot.

A still further defect was to be predicated upon strainers heretofore placed upon the market in that it was extremely difficult to provide a device of this character which will at all times remain in properly applied position *i. e.* directly to the rear of the interstices permitting of the passage of fluid from the body of the pot.

Having these defects in mind, I have now constructed a strainer which shall primarily include a device of this nature, which will be extremely simple in construction, and hence economical in manufacture.

A further object of my invention is the provision of a device of this character, although primarily intended for use in connection with coffee pots, is not necessarily limited to this adaptation, and which shall be so constructed as to permit of the normal and complete closing of the lid associated with the pot.

A still further object of my invention is the provision of a strainer which will normally lie in proper position, and in which it will be necessary to utilize a certain amount of force to effect a displacement thereof, so that any accidental movement on the part of the strainer is precluded.

Further objects of my invention will appear in the annexed specification and drawings, which latter present one practical embodiment of my invention, and in which—

Figure 1:
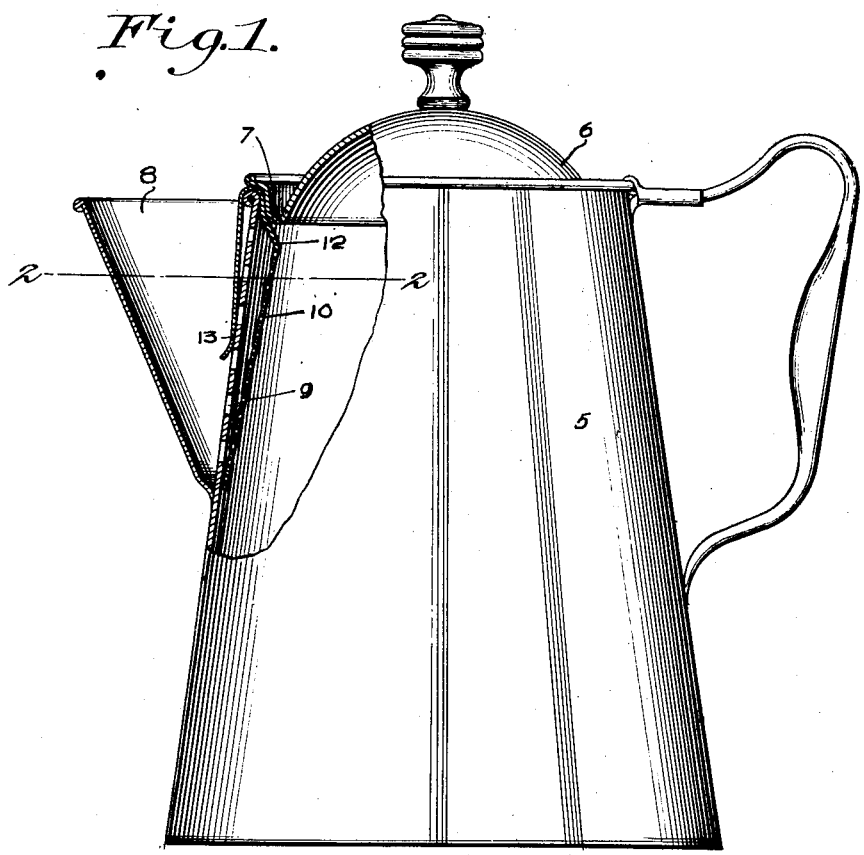
Figure 1 is a fragmentary sectional side view of a coffee pot having my improved type of strainer associated therewith.

In the embodiment illustrated, my strainer is shown as applied to a coffee pot, and it will be noted, reference being had to Fig. 1, that the numeral 5 indicates the body of the pot, formed with the conventional lid 6, including the flange seating portion 7, and also provided with a conventional spout 8 extending beyond the side wall of the pot 5, at which point the latter is provided with a series of openings 9 in the usual manner.

Figure 3:
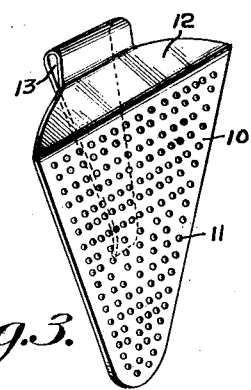
Fig. 3 is a perspective view of the strainer element in detached position.

Now with a view of forming a strainer element of extremely simple construction, it will be noted, reference being had more particularly to Fig. 3, that I utilize a plate, the body portion 10 of which is what might conveniently be termed wedge shaped, and provided with a series of perforations 11. The upper end, or broader portion of the plate is continued in the form of an inclined shoulder 12, forming an integral part thereof, and a tongue 13, forming a clip is connected to and also preferably provides an integral continuation of the inclined shoulder 12.

Figure 2:
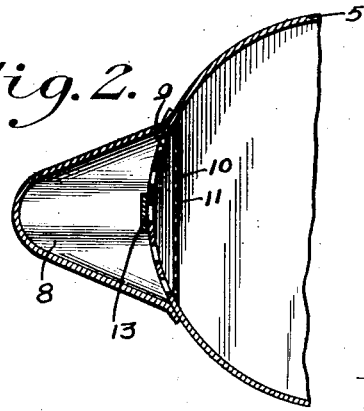
Fig. 2 is a sectional plan view taken along the line 2—2 of Fig. 1.

Referring now more particularly to Figs. 1 and 2, it will be seen that the strainer embodying construction as described, is capable of application to the body of the pot 5, subsequent to the opening of the lid 6, and the tongue 13 forming the clip portion of this strainer will engage the outer face of the side wall of the pot, and permit its body 10 to lie against the inner surface thereof, it being noted that by virtue of the peculiar wedge shaped portion of the plate, that the side edges thereof will bear in intimate contact against the inner face of the side wall of the body, thus completely covering the area provided with the openings 9.

Also by forming the clip portion in the manner shown, to wit, a downwardly extending portion, the upper end of which is bent to correspond to the bead usually forming the upper edge of a pot, and thence extending downwardly, a slight distance, and emerging into the inclined shoulder 12, that the flange 7 may clear the rear face of the straining element sufficiently to permit of a firm seating of the lid.

Thus I have constructed a strainer, which is extremely simple in construction, and hence economical to manufacture, and which will further at all times efficiently cover the openings through which the fluid is discharged from the pot, aside from the fact that it will in no way interfere in any substantial manner with the proper seating of the conventional lid affixed to the body.

Obviously numerous modifications of structure might readily be resorted to without in the least departing from the spirit of my invention, which I claim as—

1. A strainer, including a flat plate presenting interstices, an inclined shoulder portion extending from the upper edge of said plate, and a clip having one of its ends connected to the upper edge of said inclined shoulder, and being bent upon itself to provide a portion adapted to engage the upper edge of a pot.

2. A strainer, including a wedge shaped flat body portion presenting interstices, an inclined shoulder forming an integral part and extending from the upper edge of said body portion, and a clip also forming an integral part of said strainer and connected to the upper edge of said shoulder.

LOUIS DANIELS.